May 15, 1951  H. C. BRUMBAUGH  2,553,297
TRAILER BUNK
Filed Dec. 13, 1947  3 Sheets-Sheet 1
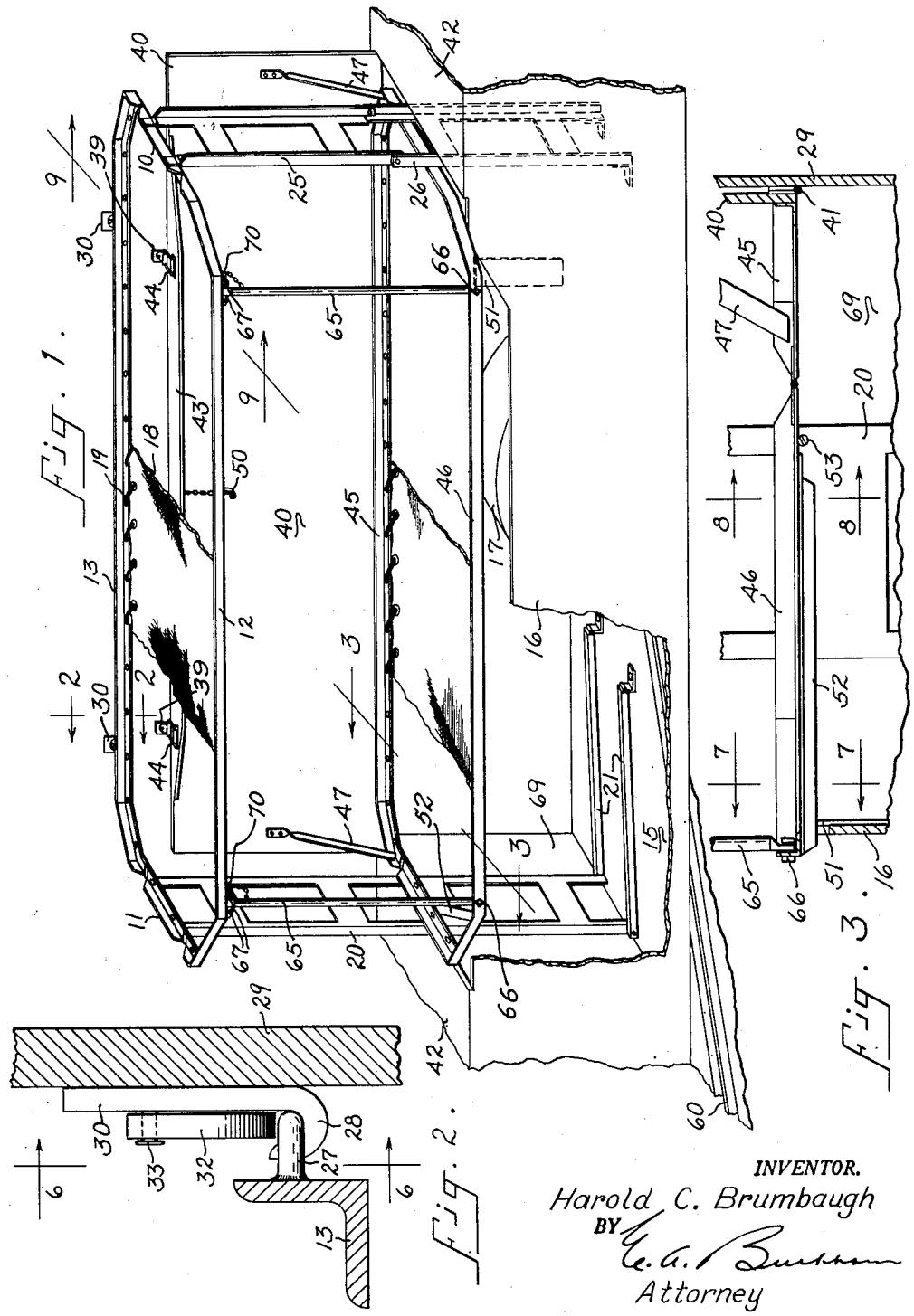
INVENTOR.
Harold C. Brumbaugh
BY
Attorney

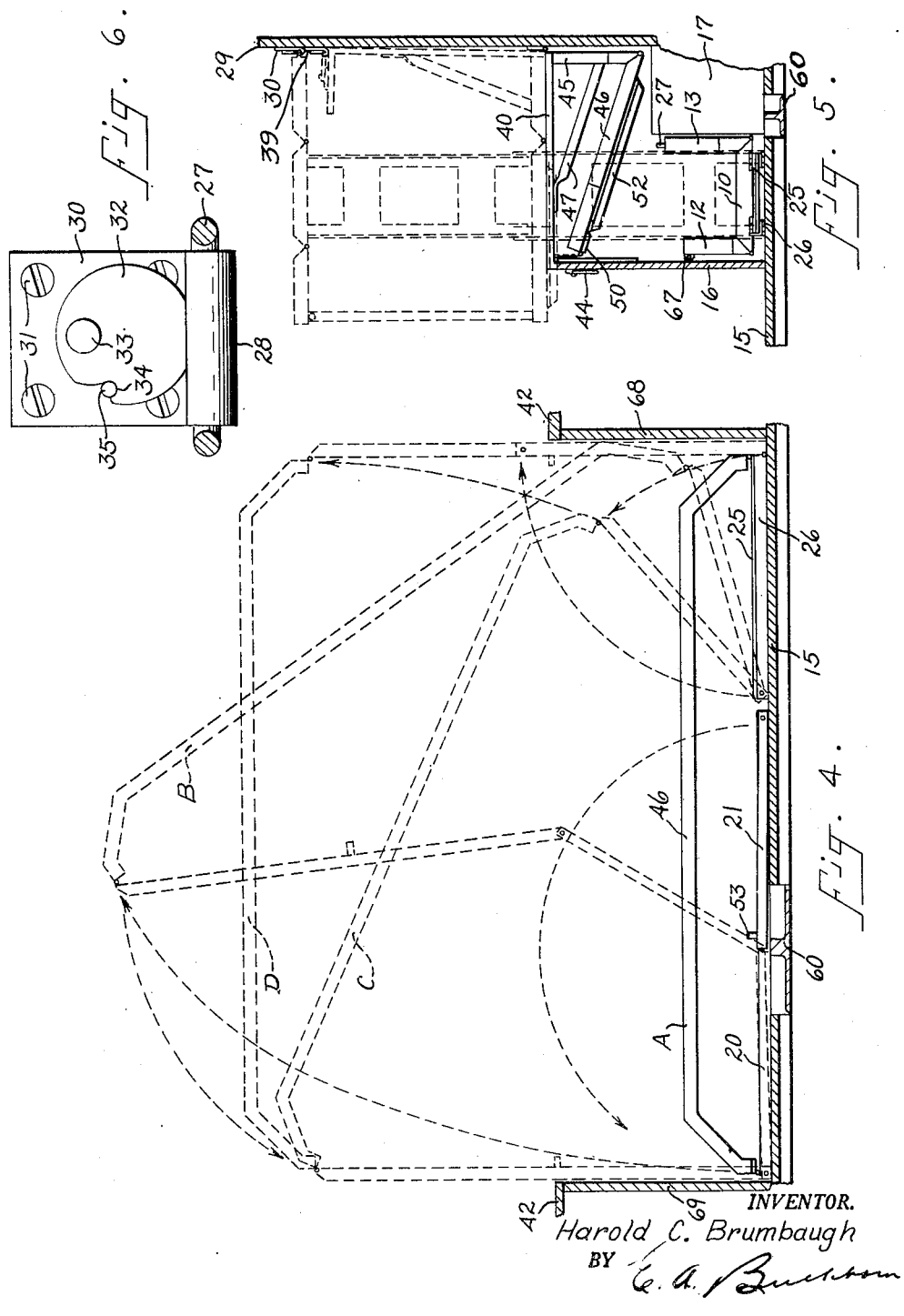

May 15, 1951 H. C. BRUMBAUGH 2,553,297
TRAILER BUNK
Filed Dec. 13, 1947 3 Sheets-Sheet 3
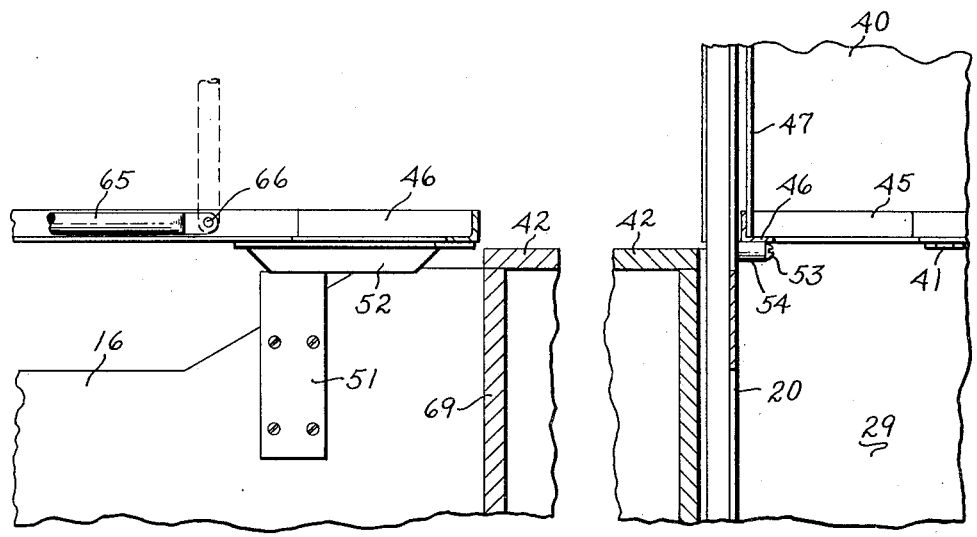
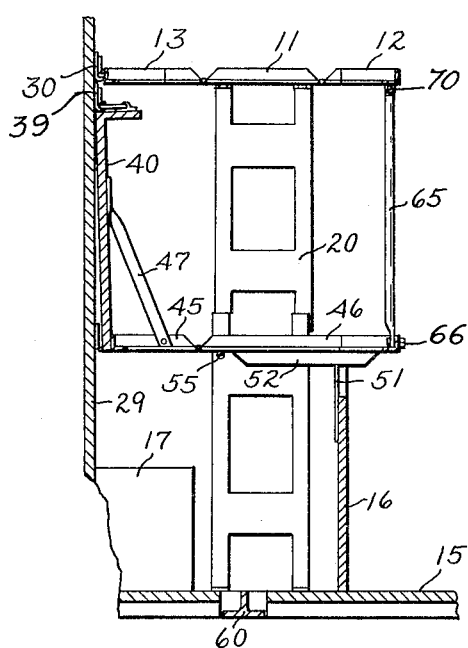
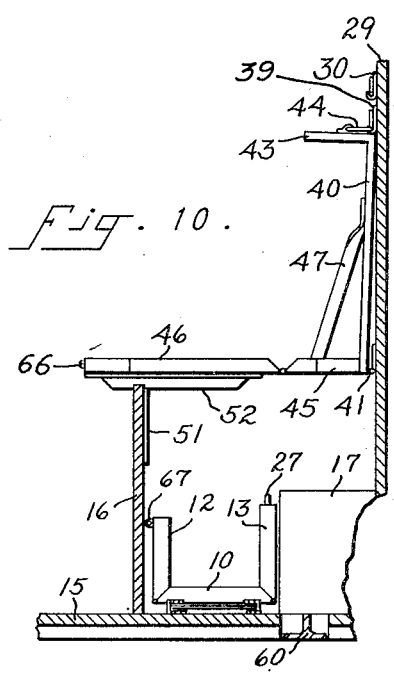
INVENTOR.
Harold C. Brumbaugh
BY
Attorney Patented May 15, 1951

2,553,297

UNITED STATES PATENT OFFICE 2,553,297

TRAILER BUNK

Harold C. Brumbaugh, Portland, Oreg., assignor of one-third to Max E. Krueger and one-third to Herbert Heltzel, both of Portland, Oreg.

Application December 13, 1947, Serial No. 791,574

11 Claims. (Cl. 5—8)

My present invention comprises an improvement in collapsible bunks for cabins, trailers, motorboats, sailboats and other places of human occupancy, particularly those with limited space. A principal purpose of the present invention is to provide collapsible bunks which may be stowed in a relatively small space when not in use, such space being such as would be provided beneath workbenches, worktables, windowseats or the like.

The present invention is an improvement upon the invention disclosed and claimed in my prior application, Serial No. 720,731, filed January 8, 1947, and is of particular utility in a collapsible trailer such as disclosed and claimed in my prior application, Serial No. 775,327, filed September 20, 1947, now Patent No. 2,518,278, granted August 8, 1950, although the invention is not to be limited to use in a collapsible trailer or the particular type of collapsible trailer disclosed in the aforesaid application. It is only required that the invention be utilized in an enclosure having a floor or floorlike structure upon which portions of the invention may be mounted.

In the aforesaid application, Serial No. 720,731, a collapsible double bunk construction is disclosed comprising two bunks which may be collapsed and stowed in a confined space such as beneath a workbench or table. These bunks were particularly designed for a trailer having an interior length of at least nine feet, the additional length beyond the ends of a normal six-foot bunk being required in order to raise or lower the upper bunk. The present invention comprises an improvement thereover in that the bunks may be raised or lowered in a six-foot space, or at least in a space no longer than the length of the body supporting portions of the bunks, so that the invention may be installed in structures having a clear interior length of slightly in excess of six feet. This improvement therefore makes the objects of the previously disclosed application, Serial No. 720,731, applicable to such small trailers as would be utilized by sportsmen for fishing and hunting trips in localities where larger and heavier trailers could not be taken.

A further object of the present invention is to provide a double bunk construction of which the individual bunks are sturdily and firmly supported to render them capable of supporting the heaviest persons in comfort.

A further object of the present invention is to provide a double bunk construction comprising an upper and lower bunk, both of which may be stowed in a confined space beneath a workbench or the like, which may be used either together when elevated to superimposed positions, or either of which may be used alone while the other remains in its stowed position.

The foregoing and other objects and advantages of the present invention will be more readily apparent from inspection of the following specification taken in connection with the accompanying drawings wherein like numerals refer to like parts throughout, while the features of novelty will be more particularly pointed out in the appended claims.

In the drawings Fig. 1 is a view in perspective of a portion of a collapsible trailer having the present invention disclosed therein, with the bunks in their positions of use, and with portions of the body supporting means of the bunks being broken away;

Fig. 2 is a vertical section on an enlarged scale taken substantially along line 2—2 of Fig. 1 and showing a detail;

Fig. 3 is a vertical section taken substantially along line 3—3 of Fig. 1 on a slightly enlarged scale;

Fig. 4 is a partially schematic front view showing the upper bunk in its stowed position in full lines and in its elevated position in dash lines, with several intermediate stages being similarly shown in dash lines, together with directional arrows to illustrate the movement of the bunk from lowered to raised position;

Fig. 5 is an end elevation looking from the right end of Fig. 1 but showing both bunks in their stowed positions in full lines and both bunks in their elevated positions of use in dash lines;

Fig. 6 is a vertical section taken substantially along line 6—6 of Fig. 2;

Fig. 7 is a vertical section taken substantially along line 7—7 of Fig. 3;

Fig. 8 is a vertical section taken substantially along line 8—8 of Fig. 3;

Fig. 9 is a vertical section taken substantially along line 9—9 of Fig. 1; and

Fig. 10 is a vertical section similar to Fig. 5 but showing the lower bunk in its stowed position.

The upper bunk of the present invention comprises a body supporting frame including parallel end members 10 and 11 joined by parallel side frame members 12 and 13, the side frame members being bent inwardly at their ends and hinged to the end members whereby the side frame members may be folded upwardly as seen in Figs. 5 and 10. By so folding the frame it may be stowed in a confined space defined by a floor 15, a front wall 16 of a boxlike construction and the inner face of the wheel well 17 of a house trailer. When the side members are swung laterally into the plane of the end members a substantially rectangular frame of bunk size is thus provided. The frame supports suitable body supporting means such as the canvas 18 joined to the frame members by a lacing rope 19 passed through suitable eyelets in the edge of the canvas and openings in the frame members. Other body supporting members may be substituted for the canvas, but the foregoing is a suitable construction which may be utilized.

The end member 11 is hingedly connected to the upper end of the rigid leg 20 of a first standard including the leg 20 and a pair of rods 21 freely pivoted to the lower end of the rigid leg 20 and to the floor 15, the pair of rods 21 thus forming a link between the leg and the floor. A more rigidly braced construction might be provided, but the spaced rods permit folding of the leg 20 between the rods and the rods need not be braced to any great extent since they carry no weight at any time. The link thus provided may be swung from one extreme position extending toward the left of its attachment to the floor as seen in Fig. 1 to a second extreme position extending toward the right of its point of attachment to the floor as seen in Fig. 4. When in the first extreme position the rigid leg 20 may be moved to a vertical position, and when in the second extreme position the rigid leg may be folded downward to lie flat against the floor. The rigid leg is preferably substantially two-thirds the length of the side frame members 12 and 13, and the link 21 is substantially one-third the length of said members.

The opposite end frame member 10 is connected to a second standard of an articulated nature comprising a first link 25 hinged to the frame member 10 and a second link 26 hinged thereto and to the floor. The links overlap to a slight extent and are so connected that they may be jamknifed together by moving the joint inwardly and lowering the bunk toward the floor until the links lie against the floor. When extended they may assume a vertical position, but the overlapped ends of the links prevent the standard from passing more than slightly beyond a straight line, thus imparting rigidity to the structure. Each link is preferably substantially one-third the length of the side frame members so that they may occupy the same plane as the rigid leg in the space beneath the left end of the bunk when the bunk is lowered.

In Fig. 4 the upper bunk is illustrated in full line at position "A" when stowed close to the floor. In elevating the bunk the left ends of the side frame members may be raised upwardly to the position shown at "B," at which position the link 21 may be swung substantially 180° to the extreme position such that the rigid leg 20 may assume a vertical position with the side frame members located as shown in position "C." During this time the articulated standard will be partially opened as necessary to permit swinging of the rigid leg. The right ends of the side frame members now may be swung upward to position "D" and the articulated standard fully extended. The side frame members may now be dropped to the horizontal plane and the bunk will be in readiness for use. Preferably the hinges between the end frame members and the side frame members are such that the side frame members may not drop beyond the horizontal position.

In order that the bunk may be braced against side movement, particularly occurring when a person climbs thereinto, the side frame member 13 may be provided with a pair of bails 27 adapted to engage hooks 28 mounted on a wall 29 of the trailer or other suitable elevated construction. The hooks 28 preferably comprise the lower upwardly bent edges of platelike members 30 fastened to the wall as by means of screws 31. A circular locking plate 32 is pivoted upon a pivot pin 33 supported by the plate and is provided with a notch 34 adapted to receive a pin 35 projecting forwardly from one edge of the plate 30. When the bails 27 are dropped in position the locking plates 32 are swung to one side and then may be dropped or forced into the position shown in Figs. 2 and 6 to prevent accidental displacement of the bails from the hooks.

The lower bunk is preferably mounted upon the under side of lid 40 of the boxlike enclosure in which the bunks are stowed, the lid being hinged at 41 along one side edge to upright members such as the side wall 29. The lid may form the top of a workbench, table or windowseat having endwise extensions 42 if desired and suitable space is available. Preferably the lid has an overhanging front lip 43 adapted to be received in an edge notch in the upper edge of the front wall 16, the lip providing means to support hinged bails 44 which may be received in the hooks of members 39 similar to the plates 30 previously described in order that the lid may be held in an elevated position against the side wall. A side portion 45 of the lower bunk is attached to the inner edge of the lower side of the lid 40 extending along the hinge line and is provided with outwardly turned ends. The opposite side portion 46 of the lower bunk is formed as a U-shaped member, the ends of which are hingedly attached to the portion 45. A canvas is stretched upon the frame thus provided as previously described. Braces 47 angularly extend from the lid 40 to the ends of the portion 45. When the lower bunk is stowed as seen in Fig. 5 the portion 46 may be held in a position adjacent the underside of the lid such as by means of a hook 50 at the end of a short chain attached to the lid. After the lid has been raised the hook 50 may be released to permit the outer portion 46 to drop to a horizontal position as seen in Fig. 10, the hinge between the two portions preferably being such that the portion 46 may not drop beyond the horizontal. The lower bunk is preferably of such length as to fit snugly between the standards supporting the upper bunk and thus prevent collapse thereof. In order firmly to support the portion 46 in a horizontal position a pair of upright plates 51 may be screwed onto the inner surface of the wall 16 in position to engage braces 52 attached to the portion 46.

In order that as firm a construction as possible may be provided, the rigid leg 20 is preferably provided with a supporting member such as a screw 53 projecting outwardly from an intermediate portion of the leg, the screw shank being surrounded by a spacer 54. The supporting member is in such position that it engages beneath the inner end of the portion 46 adjacent the hinge between the two portions, thus providing additional strength. When the rigid leg 20 is lowered it will be apparent that the screw 53 projects upwardly therefrom. At the opposite end a similar partial support may be provided on the lower link 26 of the articulated leg, comprising a similar screw 55. When the articulated link is lowered this screw will have to pass through an opening in the floor in order that a completely collapsed position may be achieved, such opening being conveniently provided in the presently disclosed construction by a recess in a structural member 60 forming a portion of the frame of the trailer. However, the screw may rest against a flat floor, leaving the right end of the upper bunk slightly elevated when stowed.

Although the upper bunk may be used alone, or the lower bunk used alone, it is preferable to use the lower bunk when the upper bunk is elevated in order to take advantage of the partial support provided by the projections on the standards. It is also preferable to use the upper bunk when the lower bunk is in its position of use in order to take advantage of a partial support for the upper bunk provided by a pair of rods 65 pivoted at 66 to the portion 46 of the lower bunk and adapted when not in use to lie along the portion 46, pointing inwardly toward each other. The rods 65 may be elevated to vertical positions and are of such length as to have their upper ends attached to vertically aligned portions of the side frame member 12 as by means of pins 70 attached to the ends of rods by short chains and adapted to pass through aligned openings in ears 67 on the member 12 and in the ends of the rods 65.

As seen in Fig. 4, the enclosure within which the bunks may be stowed may comprise a boxlike construction having end walls 68 and 69, which end walls may be located at a distance from each other only slightly longer than the length of the bunks, since no part of either bunk or of the supporting members therefor need pass beyond vertical planes through the ends of the bunks in their position of stowage or of use, all movements of parts being accomplished within the space required for the bunks themselves. The end walls 68 and 69 and the extensions 42 of the work top or bench provide additional means to prevent endwise collapsing movement of the bunks when in use.

While I have herein illustrated and described a preferred form of the present invention, modifications in detail and arrangement thereof should be apparent to those skilled in the art, and I claim as my invention all such modifications as come within the true spirit and scope of the appended claims.

I claim:

1. A collapsible bunk for use in a structure having a floor comprising a substantially rectangular frame including end members and side members, a first standard comprising a rigid leg pivoted to one of said end members and a link pivoted to the opposite end of said rigid leg and to the floor of the structure, the pivoting axes of said leg and of said link being parallel to said end members and said link being free to swing through an arc of substantially 180° whereby the bunk may be lowered toward the floor by swinging said link from a first extreme position substantially parallel to the floor to a second extreme position substantially parallel to the floor and moving said rigid leg from a position of use extending substantially vertically above the end of said link when said link is in said first extreme position to a position of nonuse substantially parallel to the floor when said link is moved to said second extreme position.

2. A collapsible bunk for use in a structure having a floor comprising a substantially rectangular frame including end members and side members, a first standard comprising a rigid leg pivoted to one of said end members, a link pivoted to the opposite end of said rigid leg and to the floor of the structure, the axes of pivoting of said leg and of said link being parallel to said end members and said link being free to swing through an arc of substantially 180° whereby the bunk may be lowered toward the floor by swinging said link from a first extreme position substantially parallel to the floor to a second extreme position substantially parallel to the floor and moving said rigid leg from a position of use extending substantially vertically above the end of said link when in said first extreme position to a position of nonuse substantially parallel to the floor when said link is moved to said second extreme position, and an articulated standard connecting the opposite end member to the floor.

3. The structure set forth in claim 2 wherein said articulated standard comprises a pair of links and a pivot connecting said pair of links, said pair of links being overlapped to permit said pair of links to fold inwardly in order to lower the bunk but to pass only slightly beyond center in the opposite direction in order to hold said pair of links against further relative movement when extended in substantial alignment with each other.

4. The structure set forth in claim 2 wherein said rigid leg is substantially two-thirds as long as said frame and said link is substantially one-third as long as said frame.

5. The structure set forth in claim 2; in combination with a second collapsible bunk comprising a second frame of such length as to fit snugly between said standards when raised, and means mounted on said standards to engage and support a portion of said second frame.

6. The structure set forth in claim 2; in combination with a second collapsible bunk comprising a second frame of such length as to fit snugly between said standards when raised, means to maintain said second frame horizontally at a substantial distance above the floor, and a pair of rods pivotally attached to one of said frames and adapted to be secured at their free ends to vertically aligned portions of the other of said frames when said bunks are in their positions of use.

7. The structure set forth in claim 2; in combination with a second collapsible bunk comprising a second frame of such length as to fit between said standards when said first bunk is raised, said second bunk being maintained at a distance above the floor.

8. A collapsible double bunk adapted to be stowed in a chest having a floor and a hinged lid, comprising a first bunk including end members and side members, a first standard comprising a rigid leg pivoted to one of said end members and a link freely pivoted to the opposite end of said rigid leg and to the floor of the structure, the axes of pivoting being in all instances parallel to said end members whereby said link may be swung through an arc of substantially 180° in order that the bunk may be moved from a lowered position with said link and said leg folded together beneath the bunk to a raised position with said link lying in the opposite direction and said rigid leg extending vertically therefrom, an articulated standard connecting the opposite end member to the floor, said articulated standard being capable of collapsing movement to permit said frame to occupy a position close to the floor and of extension when said rigid leg is raised, and a second bunk mounted on the under side of said lid and comprising a frame having end and side portions, one of said side portions being rigidly attached to said lid and the other of said side portions and said end portions forming a rigid U-shaped member pivotally attached to said one side portion whereby the major part of said second bunk may be swung to a position of nonuse adjacent said lid and, when said lid is raised, may be swung to a substantially horizontal position of use.

9. A collapsible double bunk arrangement for use in a structure having a floor comprising a bench or the like including a lid hingedly mounted along one side edge, a first bunk including a body supporting frame comprising end members and side members, a first standard comprising a rigid leg pivoted to one of said end members and a link freely pivoted to the opposite end of said rigid leg and to the floor of the structure, the axes of pivoting being in all instances parallel to said end members whereby said link may be swung through an arc of substantially 180° in order that the bunk may be raised from a lowered position with said link and said leg folded together close to the floor to a raised position with said link lying in the opposite direction close to the floor and said rigid leg extending vertically therefrom, an articulated standard connecting the opposite end member to the floor, said articulated standard being capable of collapsing movement to permit said frame to occupy a position close to the floor and of extension when said rigid leg is raised, and a second bunk mounted on the under side of said lid and comprising a frame having end and side portions, one of said side portions being rigidly attached to said lid and the other of said side portions and said end portions forming a rigid U-shaped member pivotally attached to said one side portion whereby the major part of said second bunk may be swung to a position of nonuse adjacent said lid and, when the lid is raised, may be swung to a substantially horizontal position.

10. A collapsible double bunk arrangement for use in a structure having a floor comprising a bench or the like including a lid hingedly mounted along one side edge, a first bunk including a body supporting frame comprising end members and side members, a first standard comprising a rigid leg pivoted to one of said end members and a link freely pivoted to the opposite end of said rigid leg and to the floor of the structure, the axes of pivoting being in all instances parallel to said end members whereby said link may be swung through an arc of substantially 180° in order that the bunk may be raised from a lowered position with said link and said leg folded together close to the floor to a raised position with said link lying in the opposite direction close to the floor and said rigid leg extending vertically therefrom, an articulated standard connecting the opposite end member to the floor, said articulated standard being capable of collapsing movement to permit said frame to occupy a position close to the floor and of extension when said rigid leg is raised, a second bunk mounted on the under side of said lid and comprising a frame having end and side portions, one of said side portions being rigidly attached to said lid and the other of said side portions and said end portions forming a rigid U-shaped member pivotally attached to said one side portion whereby the major part of said second bunk may be swung to a position of nonuse adjacent said lid and when the lid is raised may be swung to a substantially horizontal position, and supports extending inwardly from intermediate portions of said standards to engage beneath the end portions of said second frame when said standards are raised and said second bunk in its horizontal position.

11. A collapsible double bunk arrangement for use in a structure having a floor comprising a bench or the like including a lid hingedly mounted along one side edge, a first bunk including a body supporting frame comprising end members and side members, a first standard comprising a rigid leg pivoted to one of said end members and a link freely pivoted to the opposite end of said rigid leg and to the floor of the structure, the axes of pivoting being in all instances parallel to said end members whereby said link may be swung through an arc of substantially 180° in order that the bunk may be raised from a lowered position with said link and said leg folded together close to the floor to a raised position with said link lying in the opposite direction close to the floor and said rigid leg extending vertically therefrom, an articulated standard connecting the opposite end member to the floor, said standard being capable of collapsing movement to permit said frame to occupy a position close to the floor and of extension when said rigid leg is raised, a second bunk mounted on the under side of said lid and comprising a frame having end and side portions, one of said side portions being rigidly attached to said lid and the other of said side portions and said end portions forming a rigid U-shaped member pivotally attached to said one side portion whereby the major part of said second bunk may be swung to a position of nonuse adjacent said lid and, when the lid is raised, may be swung outwardly to a substantially horizontal position beneath said first bunk with its ends embraced by said standards, supports to engage beneath portions of said second frame when swung outwardly, connecting rods pivotally attached to the side portion forming the U-shaped member of said second bunk and adapted to be swung upwardly to vertical positions extending toward the overlying side of said first bunk, and releasable means for connecting said rods to said overlying side member.

HAROLD C. BRUMBAUGH.

REFERENCES CITED

The following references are of record in the file of this patent:

UNITED STATES PATENTS

| Number | Name | Date |
| --- | --- | --- |
| 881,071 | Hall | Mar. 3, 1908 |
| 928,726 | Witthaus | July 20, 1909 |
| 1,078,077 | Arnold | Nov. 11, 1913 |

FOREIGN PATENTS

| Number | Country | Date |
| --- | --- | --- |
| 47,451 | Denmark | June 19, 1933 |
| 336,474 | Germany | May 3, 1921 |
| 536,887 | France | Feb. 21, 1922 |